United States Patent
Ost et al.

[11] 3,835,184
[45] Sept. 10, 1974

[54] FORMAMIDE DERIVATIVES

[75] Inventors: Walter Ost; Klaus Thomas; Dietrich Jerchel, all of Ingelheim/Rhine, Germany

[73] Assignee: C. H. Boehringer Sohn, Ingelheim/Rhein, Germany

[22] Filed: May 23, 1972

[21] Appl. No.: 256,115

Related U.S. Application Data

[62] Division of Ser. No. 55,270, July 15, 1970, Pat. No. 3,702,344.

[52] U.S. Cl. .......... 260/562 A, 260/349, 260/456 R, 260/456 P, 260/561 R, 260/562 R, 424/324
[51] Int. Cl. ............................................. C07c 103/38
[58] Field of Search ..................................... 260/562

[56] References Cited
UNITED STATES PATENTS
3,786,090  1/1974  Hussain............................. 260/562

*Primary Examiner*—Harry I. Moatz
*Attorney, Agent, or Firm*—Hammond & Littell

[57] ABSTRACT

Compounds of the formula

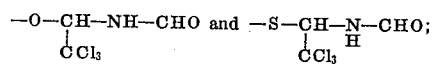

wherein X and Y are each oxygen, sulfur, —SO— or —SO$_2$—; and A is a. straight or branched alkylene of 2 to 10 carbon atoms, whose carbon chain is interrupted by phenylene, or by phenylene having substituents attached thereto, said substituents being selected from the group consisting of 1 to 2 chlorine or bromine atoms, or $$-O-\underset{\underset{CCl_3}{|}}{CH}-NH-CHO \quad \text{and} \quad -S-\underset{\underset{CCl_3}{|}}{CH}-\underset{H}{N}-CHO;$$

or b. phenylene, or phenylene having 1 to 4 halogen, 1 to 2 lower alkyl or 1 to 2 lower alkoxy substituents attached thereto;

the compounds are useful as biocidal agents, especially as systemic fungicidal agents against all types of phytopathogenic fungi, such as mildew, plant rust and Fusaria.

5 Claims, No Drawings

FORMAMIDE DERIVATIVES

This is a division of copending application Ser. No. 55,270 filed July 15, 1970, now U.S. Pat. No. 3,702,344.

This invention relates to a novel class of biocidal formamide derivatives, and to a process for preparing these compounds.

More particularly, the present invention relates to compounds of the formula

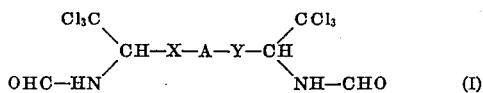
(I)

wherein X and Y are each oxygen, sulfur, —SO— or —SO$_2$—; and A is a. straight or branched alkylene of 2 to 10 carbon atoms, whose carbon chain is interrupted by a phenylene group, where said phenylene group may have substituents attached thereto, said substituents being selected from the group consisting of 1 to 2 chlorine or bromine atoms, $$-O-\underset{\underset{CCl_3}{|}}{CH}-NH-CHO \text{ and } -S-\underset{\underset{CCl_3}{|}}{CH}-\overset{H}{\underset{|}{N}}-CHO;$$

or b. phenylene, which may have 1 to 4 halogen, 1 to 2 lower alkyl or 1 to 2 lower alkoxy substituents attached thereto.

The compounds embraced by formula I above may be prepared by reacting a compound of the formula $$H - X - A - Y - H$$
(II)

wherein X, Y and A have the same meanings as in formula I, with a compound of the formula $$Cl_3C - CHZ - NH - CHO$$
(III)

wherein Z is a substituent which can be readily split off as an anion, such as chlorine, bromine, alkylsulfonyl, azido, benzoyloxy, trifluoroacetyl, alkylsulfonyloxy or arylsulfonyloxy.

The reaction is advantageously carried out in the presence of an inert organic solvent medium, such as acetone, tetrahydrofuran, chloroform, ether or mixtures of two or more of these, at temperatures between about 0 and 80°C., preferably at room temperature, and advantageously in the presence of an acid acceptor, such as a tertiary amine.

If X and/or Y in formula I are —SO— or —SO$_2$—, such compounds may also be prepared by mild oxidation of a corresponding compound of the formula I wherein X and/or Y are sulfur, for instance, with hydrogen peroxide/acetic acid at room temperature.

Most of the compounds according to the present invention are amorphous substances or viscous, colorless to yellowish liquids; they are readily soluble in most organic solvents except aliphatic hydrocarbons, but very sparsely soluble in water.

The following examples further illustrate the present invention and will enable others skilled in the art to understand it more completely. It should be understood, however, that the invention is not limited solely to the particular examples given below.

EXAMPLE 1

Preparation of 1,2-bis-[(1'-formylamino-2',2',2'-trichloro)-ethoxy]-benzene 8.2 gm of triethylamine were added dropwise to a solution of 4.40 gm of 1,2-benzenediol and 16.9 gm of N-(1,2,2,2-tetrachloro-ethyl)-formamide in 100 ml of tetrahydrofuran. Thereafter, the reaction mixture was stirred for one hour at room temperature, then the precipitated triethylamine hydrochloride was separated by vacuum filtration, and the filtrate was evporated in vacuo. The syrupy raw product was purified by twice dissolving it in isopropanol and reprecipitating it each time by addition of an equal volume of hexane. The purified product was dried in vacuo at 95°C., yielding a colorless, amorphous substance having a sintering point of 60°–70°C. and a melting point of 102°–104°C. It was identified to be the solvate of 1,2-bis-[(1'-formylamino-2',2',2'-trichloro)-ethoxy]-benzene of the formula

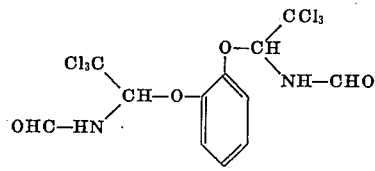

with ½ mol of tetrahydrofuran.

| Analysis (solvate): | | | |
|---|---|---|---|
| Calculated (percent): | C, 33.97; | H, 2.85; | N, 5.65. |
| Found (percent): | C, 33.3; | H, 2.85; | N, 5.98. |

EXAMPLE 2

Using a procedure analogous to that described in Example 1, the solvate of 1,3-bis-[(1'-formylamino-2',2',2'-trichloro)-ethoxy]-benzene with ½ mol tetrahydrofuran, a virtually colorless, amorphous powder having a sintering point of 60°–70°C. and a melting point of 105°–110°C., was prepared from 1,3-benzenediol and N-(1,2,2,2-tetrachloroethyl)-formamide.

| Analysis (solvate): | | | |
|---|---|---|---|
| Calculated (percent): | C, 33.97; | H, 2.85; | N, 5.65. |
| Found (percent): | C, 33.95; | H, 2.79; | N, 6.14. |

EXAMPLE 3

1,2-Dihydroxy-3,4,5,6-tetrachloro-benzene and N-(1,2,2,2-trichloro-ethyl)-formamide were reacted in tetrahydrofuran in the presence of triethylamine, as described in Example 1. The raw product was purified by dissolving it in benzene, washing the solution several times with water, drying it and evaporating it in vacuo. 1,2-Bis-[(1'-formylamino-2',2',2'-trichloro)-ethoxy]-3,4,5,6-tetrachlorobenzene, a reddish viscous syrupy substance of the formula

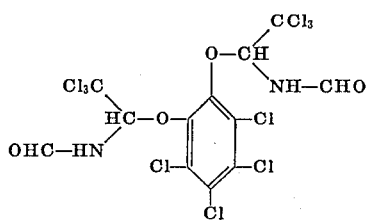

was obtained.

EXAMPLE 4

Hydroquinone and N-(1,2,2,2-tetrachloro-ethyl)-formamide were reacted and the reaction mixture was worked up, as described in Example 1. The syrupy raw product was made to crystallize by addition of a mixture of isopropyl ether and hexane, and the crystalline product was recrystallized from acetonitrile, yielding 1,4-bis-[(1'-formylamino-2',2',2'-trichloro)-ethoxy]-benzene, decomp. pt. 183°–185°C., of the formula

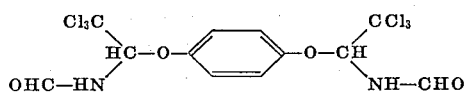

| Analysis: | | | |
|---|---|---|---|
| Calculated (percent): | C, 31.4; | H, 2.20; | N, 6.1. |
| Found (percent): | C, 31.5; | H, 2.56; | N, 6.0. |

The compounds according to the present invention, that is, those embraced by formula I above, have useful properties. More particularly, the compounds of the instant invention exhibit very effective biocidal activities, especially systemic fungicidal activities against phytopathogenic fungi, such as mildew (*Erysiphe graminis*), plant rust fungi and Fusaria.

For use as fungicidal agents, the compounds of the present invention are incorporated as active ingredients into conventional agricultural fungicidal compositions, such as wettable powders, emulsion concetrates, solutions, sprays, granulates, dusting powders and the like, i.e. compositions consisting essentially of an inert liquid or solid carrier and an effective fungicidal amount of the active ingredient. By virtue of their good solubilities in organic solvents, the compounds of the present invention are particularly well adapted for the preparation of highly concentrated solutions and emulsion concentrates which are diluted to the desired concentration of active ingredient just prior to their use as fungicidal agents on plants. The active ingredient concentration range in such highly concentrated solutions or emulsion concentrates is preferably about 0.05 to 50 percent by weight, based on the total weight, and the concentrated compositions may be diluted to an active ingredient concentration of 0.5 to 0.0001 percent prior to use, although dusting powders and so-called ultra-lowvolume compositions (ULV) may also have a higher active ingredient content.

The following examples illustrate a few prophylactic fungicidal compositions comprising a compound of the present invention as an active ingredient and represent the best modes contemplated of putting the invention into practical use. The parts are parts by weight unless otherwise specified.

EXAMPLE 5

Spray

The spray composition was compounded from the following ingredients:

| | parts |
|---|---|
| End product of Example 1 | 10 |
| N-Methyl-pyrrolidone | 39 |
| Triethyleneglycol | 41 |
| Condensation product octylphenol and 10 mols of ethyleneglycol (wetting agent) | 10 |

Preparation:

The ingredients were intimately admixed with each other, resulting in a liquid composition which was an effective prophylactic fungicide when applied to plants by the ULV-process; the composition may also be diluted with water into a sprayable aqueous emulsion.

EXAMPLE 6

Wettable Powder

The powder composition was compounded from the following ingredients:

| | parts |
|---|---|
| Product of Example 2 | 50 |
| Kaolin | 45 |
| Silicic acid | 2 |
| Sodium dioctyl sulfosuccinate | 2 |
| Sodium lignin sulfonate | 1 |

Preparation:

The ingredients were intimately admixed with each other, and the mixture was milled into a fine powder, which was suspended in water to make the active ingredient concentration from 0.5 to 0.001 percent by weight. The resulting sprayable aqueous suspension was an effective prophylactic fungicide when applied to plants.

EXAMPLE 7

Suspension Powder

The powder composition was compounded from the following ingredients:

| | parts |
|---|---|
| Product of Example 3 | 80 |
| Calcium lignin sufonate | 8 |
| Colloidal silicic acid | 5 |
| Sodium sulfate | 5 |
| Diisobutyl naphthalene sodium sulfonate | 2 |

Preparation:

The ingredients were intimately admixed with each other, and the mixture was milled into a fine powder, which was then suspended in a sufficient amount of water to make the active ingredient content of the aqueous suspension from 0.5 to 0.0001 percent by weight. The resulting sprayable suspension was an effective prophylactic fungicide when applied to plants.

EXAMPLE 8

Aerosol Spray

The spray composition was compounded from the following ingredients:

| | parts |
|---|---|
| Product of Example 4 | 0.05 |
| Sesame oil | 0.10 |
| N-Methyl-pyrrolidone | 10.00 |
| Mixture of Frigen 11 and 12 | 89.85 |

Preparation:

The active ingredient and the sesame oil were dissolved in the N-methyl-pyrrolidone, the solution was charged into an aerosol container, which was then pressurized with the Frigen propellant gas mixture. The resulting aerosol spray was an effective fungicide when applied to plants.

Analogous results were obtained when any one of the other compounds embraced by formula I was substituted for the particular active ingredient in Examples 5 through 8. Likewise, the amount of active ingredient in these illustrative examples may be varied to achieve the concentration range set forth above, and the amounts and nature of the inert carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A compound of the formula 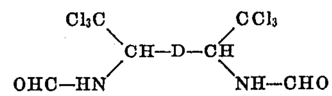 wherein D is-O-phenylene-O-, or -O-tetrachlorophenylene-O-.

2. A compound according to claim 1, which is 1,2-bis-[(1′-formylamino-2′,2′,2′-trichloro)-ethoxy]-benzene.

3. A compound according to claim 1, which is 1,3-bis-[(1′-formylamino-2′,2′,2′-trichloro)-ethoxy]-benzene.

4. A compound according to claim 1, which is 1,2-bis-[(1′-formylamino-2′,2′,2′-trichloro)-ethoxy]-3,4,5,6-tetrachloro-benzene.

5. A compound according to claim 1, which is 1,4-bis-[(1′-formylamino-2′,2′,2′-trichloro)-ethoxy]-benzene.

* * * * *